United States Patent [19]

Willisch

[11] 4,146,382

[45] Mar. 27, 1979

[54] METHOD OF AND APPARATUS FOR THE TREATMENT AND PURIFICATION OF REFUSE, OR REFUSE/SEWAGE SLUDGE MIXTURES BY MEANS OF COMPOSTING

[76] Inventor: Hannes Willisch, Scheurenhof, 5025 Stommeln near Cologne, Fed. Rep. of Germany

[21] Appl. No.: 734,426

[22] Filed: Oct. 21, 1976

[30] Foreign Application Priority Data

Oct. 21, 1975 [DE] Fed. Rep. of Germany ....... 2547134
Mar. 12, 1976 [DE] Fed. Rep. of Germany ....... 2610521

[51] Int. Cl.² ............................................ C05F 11/08
[52] U.S. Cl. ............................................ 71/9; 71/12; 71/13; 71/64 JC; 264/33; 422/184; 422/193; 422/239
[58] Field of Search ...................... 71/8, 9, 10, 12, 13, 71/64 JC; 61/53.66; 264/33; 23/259.1

[56] References Cited

U.S. PATENT DOCUMENTS

| 857,588 | 1/1907 | Boyle | 264/33 X |
|---|---|---|---|
| 1,156,830 | 10/1915 | Williams et al. | 264/33 X |
| 1,525,087 | 2/1925 | Murray | 264/33 X |

FOREIGN PATENT DOCUMENTS

| 2426285 | 4/1975 | Fed. Rep. of Germany | 71/9 |
|---|---|---|---|
| 852492 | 10/1960 | United Kingdom | 23/259.1 |

*Primary Examiner*—Ferris H. Lander
*Attorney, Agent, or Firm*—Diller, Ramik & Wight

[57] ABSTRACT

Method and apparatus is disclosed for composting material such as refuse and preferably a mixture of refuse and sewage sludge. The material is piled in such a way that transverse tunnels are provided whereby natural air circulation is obtained into and through the material remains undisturbed during maturation, thereby allowing aerobic bacterial fermentation to progress efficiently and without interruption. Because higher stacks and consequent greater volumetric capacity thereof is attained, greater efficiency of space utilization. The apparatus involves core structures which temporarily support the material and form the tunnels or ventilation passages therein, the core structures being removed when the material becomes self-supporting.

39 Claims, 7 Drawing Figures

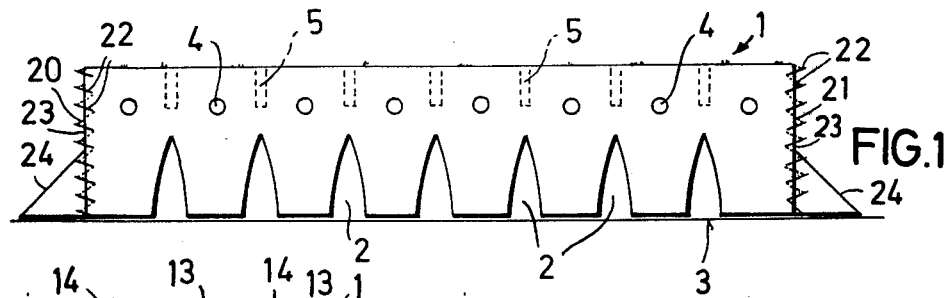
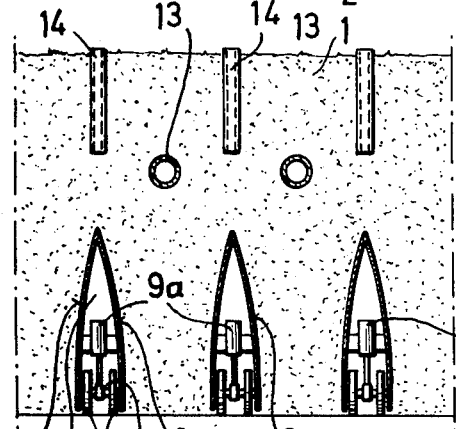
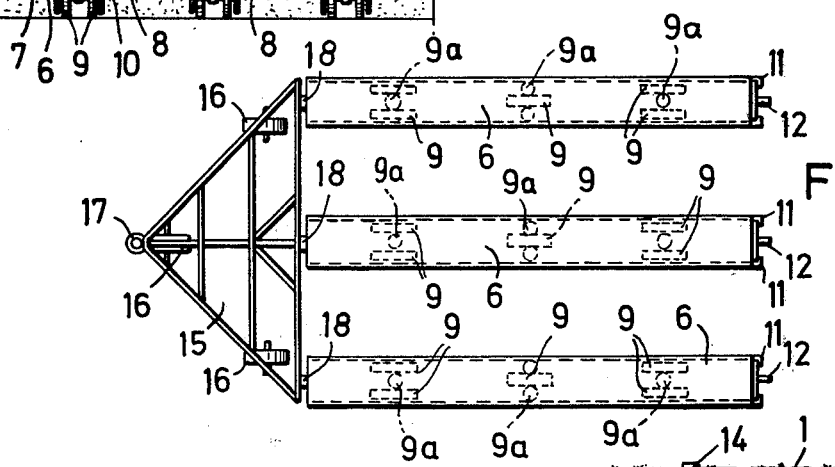
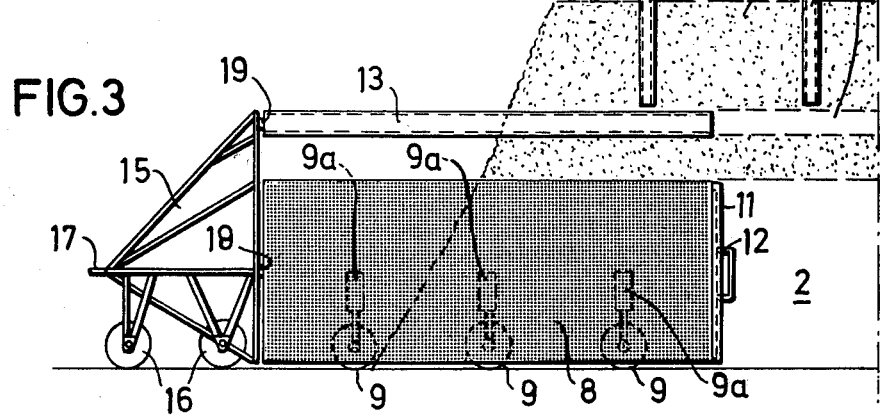

METHOD OF AND APPARATUS FOR THE TREATMENT AND PURIFICATION OF REFUSE, OR REFUSE/SEWAGE SLUDGE MIXTURES BY MEANS OF COMPOSTING

BACKGROUND OF THE INVENTION

The present invention relates to a method of and apparatus for the treatment and purification of refuse, such as domestic refuse, industrial waste and the like, in particular of refuse/sewage sludge mixtures by the composting method, especially thermal retting.

Of the various ways of disposing of quantities of waste, that is to say of solid waste materials, such as domestic refuse, bulk waste, organic industrial by-products and industiral waste, also liquid waste, especially digested sludge from sewerage works, the composting process is to be preferred because in this way not inconsiderable quantities of the material can be recycled.

For the purpose of composting the waste material, or refuse/sludge mixture, the procedure is that the domestic and industrial waste with sewage sludge is reduced by milling action in suitably balanced quantities. Portions of the reduced mixture which exceed a predetermined dimension are then extracted by sifting, the materials concerned being glass, paper, plastic materials, rubber and metals. Small quantities of compostable materials in this diameter range may be returned to the milling stage. The through-material is then conveyed to a second finer sieve which accepts particles of predetermined dimension, for example under 10 mm, or possibly 15 mm. Fractions larger than the predetermined may again be returned to the milling stage, at which any iron is again extracted from the mass by magnets. When the through-material has reached the desired fineness, it is ready for composting. The proportion of sewage sludge is so adjusted that a relatively moist product is obtained which has a water content of approximately 45% to 55%.

The composting of waste material treated in the manner described still offers difficulty in obtaining complete and thorough purification by bedding the material. By the composting process an internal heat is generated in the material which may reach a temperature of approximately 75° C., said heating being initiated by aerobic bacterial activity. The material is set up on clamps or stacks for composting. In this connection it has been found that the stacks cannot be built very high. Even with a height of approximately 1.30 m the so-called "black feet" occur, that is to say the material begins to rot because the air does not have sufficient access. Consequently, when waste material is stacked thus, it requires to be frequently turned over in order to ensure that the interior of the stack is also brought sufficiently into contact with the outer air. Turning over of the stack thus involves additional labor, time and expense. The turning over operation also has the disadvantage that heat is lost so that the desired temperature condition within the stack due to the aerobic bacterial activity requires time to build up. Even with heights of 1.30 m to 1150 m, a considerable physical area is required to cope with the daily accumulations of waste material. If stacks of lesser heights are employed, the space requirement is so enormous that composting becomes uneconomical. Attempts have also been made to ventilate the material, prepared for composting, by artificial means, that is to say, by utilizing fans which produce suction and pressure flows of air to aerate the stacks in order to prevent rotting of the waste material. Apart from the fact that the employment of blowers involves considerable additional costs and that these are required to be constantly moved from area to area, it is never possible to produce odourless composting of the material and prevent the occurrence of rotting patches in the stacks by this means. Artificial ventilating also cannot be so contrived that the bacterial activity in the compost heap proceeds undisturbed. Another attempt to employ natural aeration of the compost heap consists in placing the compost material in cages which are supported above the ground so that the surrounding air can reach the cage and consequently also the material from all sides. This method of aeration is not satisfactory either since unless the cages are rather small, pockets of rot occur which ruin the entire compost heap. In addition, a great deal of mechanical handling is required in filling emptying the cages, and also for turning over the material.

BRIEF SUMMARY OF THE INVENTION

The object of the present invention is to arrange the waste material which has been pepared for composting in stacks of large volume in such a manner that the occurrence of rotting or of pockets of decay is substantially eliminated, the finished product being obtained by exposing the stack merely to the surrounding air. The method of treating and purifying the waste material, or refuse/sewage sludge mixtures by means of thermal retting is according to the invention characterized in that the waste material which has been brought to a predetermined particle size and otherwise prepared for composting, is bedded out in stacks in such a manner that along the inside of the stack run transverse tunnel-like courses at floor level, with possibly transverse channel-like passages arranged above these and vertical flue-like vents disposed at intervals, the tunnel-and channel-like passages remaining open at least at one end, while the waste material in the stack is left undisturbed until the compost has matured, that is to say until the finished product is obtained.

By employing stacks so constructed with transverse tunnel-like courses passing directly along the floor and with vertical flue-like vents, the stack becomes self-aerating, which results in complete and homogeneous thermal retting and purification of the stack material. This honeycomb-ventilation system within the stack produces self-aeration at all points in the stack, whereby the very large quantities of air require for odor-free, aerobic fermentation are drawn in and expelled continuously and at a low speed of flow. By means of the thermal updraught occasioned by the fermentation itself, a continuous exchange of gases is made possible without the material being moved or the air being set in motion by fans. The hollow courses and vents provided in the compost mass serve as circulatory channels and ensure excellent ventilation and also the required exchange of gases in the entire material in process of composting. The necessary generation of heat up to approximately 75° C. due to aerobic bacterial activity is produced and maintained by natural means. As this progresses, the entire mass of compost becomes fungous in texture throughout. Since the compost body is left completely undisturbed, the bacterial activity continues unimpeded during the entire period of composting and thus becomes fully effective. After a suitable time, for example approximately three months, the stack material is completely mature and can be removed for sale, or, if the time is not suitable to the sale of compost, the product may be allowed to remain as long as is necessary in stack form without further manipulation. The matured compost is growth-promoting, stable in moisture-retention and thoroughly mineralized. The self-aeration of the stacks occurs without unpleasant odors. The final product obtained is of consistent quality and has its biological phase fully completed.

The transverse, tunnel-like courses should reach a height of approximately one half, or possibly two thirds of the height of the stacks. They should be spaced preferably at intervals of approximately 1 m to 1.5 m longitudinally of the elongate stack. The remaining channel-like passages should preferably be offset in relation to the tunnel-like courses, so that the cross-section of the stack is seen to be provided with sufficient longitudinally spaced ventilating passages. The vertical flue-like vents should be dispersed both longitudinally and laterally in the stack, preferably above the tunnel-like courses, with fixed intervals between them. The stack itself is preferably so constructed that it is supported at its opposite ends by relatively firm lateral walls. The fungous texture within the material, due to the bacterial activity, very quickly imparts to it an inner solidity. The large lateral surfaces contribute beneficially to cross-ventilation.

According to a further feature of the invention, the horizontal and vertical passages in the stack are produced by means of cores. For the tunnel-like courses cores of a certain length are employed whose lateral walls are perforated in the manner of a sieve. The core structure is constructed so that it is movable so as to be withdrawn from the stack and is adjustable vertically. This may be achieved by the use of supporting rollers which have provision for vertically adjusting the core structure. In particular, the tunnel core structure should be of pointed-arch construction in cross-section. The width of each tunnel should be approximately one third to one quarter of its height. By means of the movable tunnel core structure a stack honeycombed with tunnels is created which is able to accept the continuous stream of treated refuse/sludge mixture at a steady rate and without interruption. In this way aerobic bacterial activity is generated without delay, resulting in creation of an entirely fungous structure in the compost body. The warmth required for purification of the product may begin immediately. Thus, a stack is obtained which is rapidly self supporting so that the core structure initially forming the tunnels can be withdrawn, leaving the stack with an internal natural circulation system comprising tunnel-like courses, additional channel-like passages, and also vents. Thus, the stack rapidly becomes self-supporting so that the channel-forming structure can be withdrawn and the stack thereafter maintains it structural form without assistance throughout most of the retting process. The tunneled stack can also accept the continuously arriving stream of ready-treated refuse/sludge continuously and without interruption. This arrangement ensures that there are no bottlenecks at the treatment plant in the output of treated waste material. Since the core structure is withdrawn from the stack as the composting mass increases after the stack is completed over a certain length the core structure can be employed once more on the site for the construction of a new stack. A high degree of flexibility is obtained in the course of the operation. The requirements in power and man-hours are very modest.

A further feature of the invention resides in the fact that the lateral walls of each tunnel core structure tapers in longitudinal direction. This slightly wedge-shaped formation facilitates considerably the withdrawing of the core structure from the compost body, without the possible necessity of raising or lowering the core structure partly or wholly during operation of the plant. On the other hand, the formation of the longitudinal tunnel-like courses is not in any way adversely affected or rendered more difficult. Due to the relatively rapid and thorough fungous texture created by the bacterial activity, the stack material acquires a firm inner structure, so that, as the stream of continuously treated refuse/sludge mixture arrives, each tunnel core structure or assembly can be withdrawn relatively quickly from the stack as the material alongside and above the tunnel-like core structure becomes relatively quickly self-supporting. Since it is possible to dispense with any lowering movement of the tunnel core structure to withdraw it, this represents a considerable economy in labour.

The tapering of the tunnel core structure from front to rear should amount on average to approximately 10%. In general, the tapering should be such that the resulting reduction in width of the tunnel core structure is greater than that occurring in its height. Thus, for example, the reduction in width of each tunnel core over its entire length may amount to approximately 30% whereas the height of each tunnel core over its entire length may be reduced by only 2% to 5%. In this way, the height of the tunnel-like courses in the stack is basically unaltered, which in the forming of the stack in conjunction with the further channel-like passages and flue-like ventilation shafts, is of advantage in the self-aeration of the stack.

A suitable arrangement is that a plurality of tunnel cores are arranged in spaced relationship side-by-side and suported by a common frame. This assembly may also be so constructed that is carries further cores which form the further ventilation channels above the tunnels. These further cores are extracted from the consolidated stack together with the tunnel cores. Each tunnel core may be sealed off at its rear end by a wall in which slides are preferably fitted for the purpose of regulating the incoming current of ambient air.

If it is desired that the stack has relatively steep end walls, a type of shuttering may be employed during construction which is in the form of a series of supports. As soon as the composting mass has become self-supporting, the shuttering can be removed. It can then be easily transferred. For this purpose, these supports can also be rendered mobile.

BRIEF DESCRIPTION OF THE DRAWINGS

The invention will now be described in more detail with reference to the accompanying drawings, in which:

FIG. 1 is a cross-section through a tunnel stack according to the invention, shown diagrammatically;

FIG. 2 shows part of the cross-section of FIG. 1 on a larger scale;

FIG. 3 is a longitudinal section through the tunnel stack of FIG. 1 on a larger scale and employing the core assembly for producing the hollow spaces in the compost body;

FIG. 4 is a plan view in diagrammatic form of the tunnel core assembly with transporters;

DETAILED DESCRIPTION OF THE INVENTION

Figure 5:
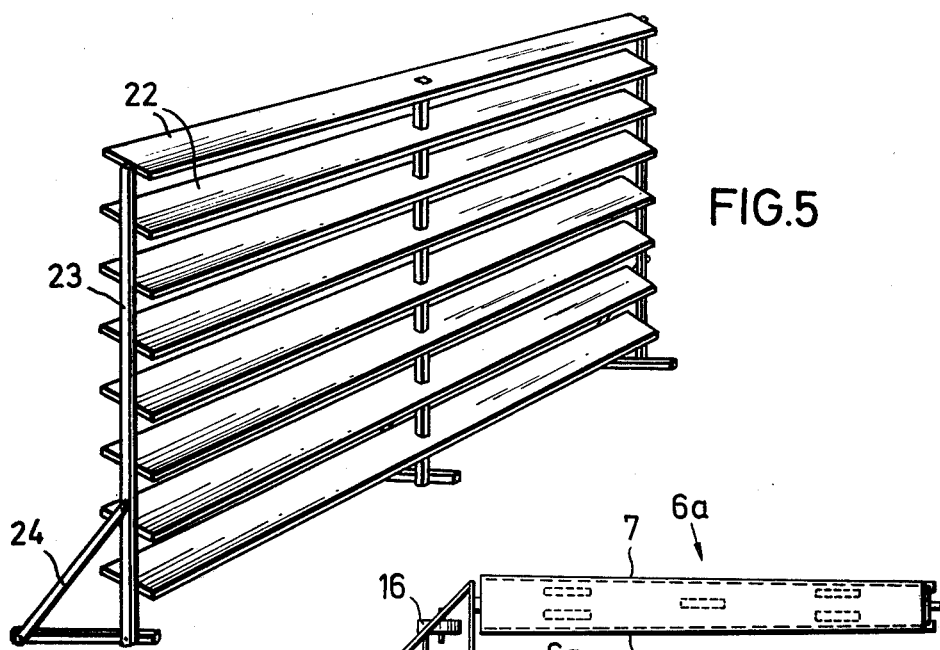
FIG. 5 shows a method of execution of the end wall elements for the compost body.

The compost body comprising a mixture of refuse and sludge which has been prepared for composting assumes the form of a stack of any desired length, through which pass in transverse direction tunnel-like courses 2. Said courses 2 are preferably of pointed-arch cross-section and begin immediately from the ground 3 or floor of the site and are spaced longitudinally along the length of the stack. Within the compost body of the stack 1 transverse channels 4 are also provided which are spaced longitudinally along the entire length of the stack. The channels 4 should preferably be located above the tunnel courses 2 but are preferably in staggered relation thereto as shown. In addition there are provided in the compost body of the stack 1 vertical flue-like vents 5 which are formed by suitably constructed tubes 14 having an open outlet at their upper extremity. The vents 5 may be located directly on the axes of the tunnel courses and at a suitable distance therefrom. The vents 5 are arranged in regularly or irregularly longitudinally spaced relation and are also distributed laterally of the stack 1. Such a tunnel system, with associated channels and vents serves to supply the interior of the compost body with difficient quantities of the ambient air while, at the same time, the longitudinal and vertical passages in the compost body ensure efficient self-aeration of the stack, with active exchange of gasses from the compost material. This self-aeration or natural circulation of ambient air through the stack with inherently low rate of flow reliably stimulates aerobic bacterial activity which is evenly distributed throughout the compost, whereby very soon the heat generated by aerobic bacterial action raises the temperature to a value which may reach as high as 75° C., as a result of which the entire compost body acquires in a short time a fungous texture in the material. Since a compost stack with such a tunnel-, channel- and vent system can be left relatively unattended without the occurrence of patches of rot, excessive damp, "black feet" or the like, bacterial activity over the maturation period is completely undisturbed and is thus highly effective. After a suitable time, for example approximately three months, the compost is fully retted through and purified. The material is now storable and may be used for appropriate purposes. It is very suitable as a soil-conditioner for agriculture and for the reclamation of land for agricultural purposes.

To form the tunnel-like courses 2, core elements 6 are used, the walls 7 and 8 of which carry perforation or are preferably of sieve-like construction. The cores 6 have preferably a cross-section of pointed-arch form and are mounted on rollers 9 so as to be movable. Moreover, the cores 6 can be raised or lowered relative to the rollers 9. This can be done by employing extensible hydraulic raising means 9a connecting the axles 10 of the rollers to the cores 6.

When the compost is being stacked, the tunnel cores 6 are in a raised position relative to the rollers 9. When it is required to withdraw the tunnel core assembly from the compost stack, it is lowered. This produces a gap between the pointed arch shaped walls 7, 8 and the compost, so that the tunnel core assembly can be withdrawn without the compost material being drawn along with it. This gap may be approximately 5 cm. At the end of each tunnel core 6 in a rear wall 11. Slides 12 may be provided on the wall 11 which can be adjusted in either direction in order to regulate the admission of air.

The long channel-like passages 4 are preferably formed by the tubes 13 which extend over the length of the core assembly. The circumferential surfaces of tubes 13 are not perforated suitably in order to ensure an easy withdrawal from the compost stack 1. However, in suitable cases, perforations can be also provided in the tubes 13.

The flue-like vents 5 are formed by the tubes 14 which are inserted vertically into the compost stack 1. The tubes 14 can be withdrawn from the compost stack as soon as it has become self-supporting. They may also remain in the compost stack until the product clamp is removed.

With a height of stack 1 of about 4 to 5 m the tunnel core 6 has an advantageous ogival height of about 2 to 2.50 m, it being possible that the breadth of the tunnel core is about 0.50 to 0.60 m. The length of the tunnel core and also the length of the horizontal tubes 13 is advantageously about 5 to 6 m. The distance of the tunnel core of each other shall be about 1 m to 1.50 m. The flue pipes may have a length of about 1 m to 1.50 m. A diameter of 0.20 to 0.30 m will do generally for the horizontal tubes 13. The flues may have a diameter of 0.10 to 0.15.

For applying the tunnel cores 6, it is advantageous to use a frame 15 provided with wheels 16 and with a hitch loop 17 for being coupled to a tractor or the like. It is advantageous for the frame 15 to be as broad as to permit to trail therewith several tunnel cores 6 by means of corresponding coupling means 18. With a frame 15 any desired number of tunnel cores are drawn continuously along as the erection of the compost stack 1 proceeds and are withdrawn from the stack as soon as it has become self-supporting. The rollers 9 of the tunnel cores 6 are mounted within the cores 6 in order to prevent them from in any way damaging the tunnel 2 which has been formed when a core assembly is withdrawn. As can be seen in FIG. 4 one core assembly may consist of three tunnel cores 6, all joined to a common frame 15 by means of the connectors 18. The horizontal tubes 13 are preferably also connected to the frame 15 by coupling means 19, so that the tubes 13 can also be withdrawn from the compost stack 1 at the same time as the tunnel cores 6 are withdrawn. Thus, each core assembly includes three tunnel cores 6 and two horizontal tubes 13, see FIG. 2. The frame 15 supports all of these elements in cantilever fashion and the frame itself is provided with supporting wheels 16 and a hitch 17 so that the core assembly and frame unit may be withdrawn readily.

Normally, each stack will initially utilize a plurality of core assemblies and corresponding frames 15, disposed in side-by-side relation and properly positioned for forming the tunnels 2 and passage 4. As the building of the stack progresses from one end to the other, the core assembly first covered may be withdrawn and transported to a new site. Then the second core assembly covered may also be withdrawn and transported to a new site, and so on. Thus, there is a progressive withdrawal of core assemblies and transportation thereof to a new site, making the process a continous one.

In order to support the end walls of the compost stack 1 the wall support elements 20, 21 are preferably employed which are so constructed as to provide practically complete access of the surrounding air to the compost material. Accordingly, the wall elements have slats 22 distributed over their height and secured to uprights 23. These slats consist preferably of planks secured between posts. The slats are preferably inclined downwards towards the side adjacent to the compost stack, the angle of inclination being capable of adjustment if necessary. For this purpose the slats may be rotatably mounted. The surface inclined downwards towards the compost stack ensures that rain etc., is not allowed to run down the exposed side of the end walls, which might lead to the gathering of water at the base, with the consequent risk of "black feet" occurring in the compost stack. The rainwater directed towards the stack is absorbed into the stack itself and the efficient ventilation system ensures that the moisture absorbed into the stack is quickly vaporized by the generation of heat in the stack.

The end walls preferably assume the form of upright supports 24. Their length should correspond to the length of the tunnel cores 6. The height of the end walls should be that of the intended compost stack 1 to be formed. The walls 20, 21 may be withdrawn from the compost stack 1 as soon as the stack, due to the fungous structure resulting from bacterial activity, has become self-supporting and has formed a body of fixed shape.

Figure 6:
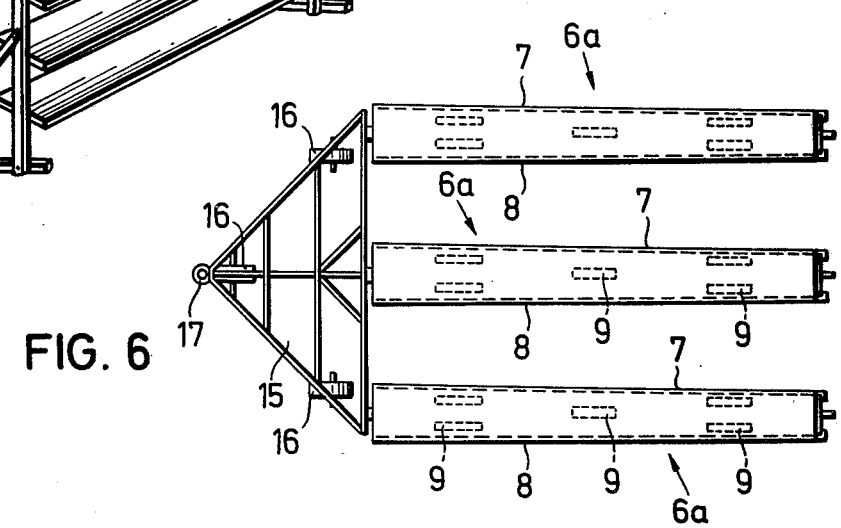
FIGS. 6 and 7 are diagrammatic views of a tapering tunnel core structure according to the invention, in plan and in longitudinal section.
Figure 7:
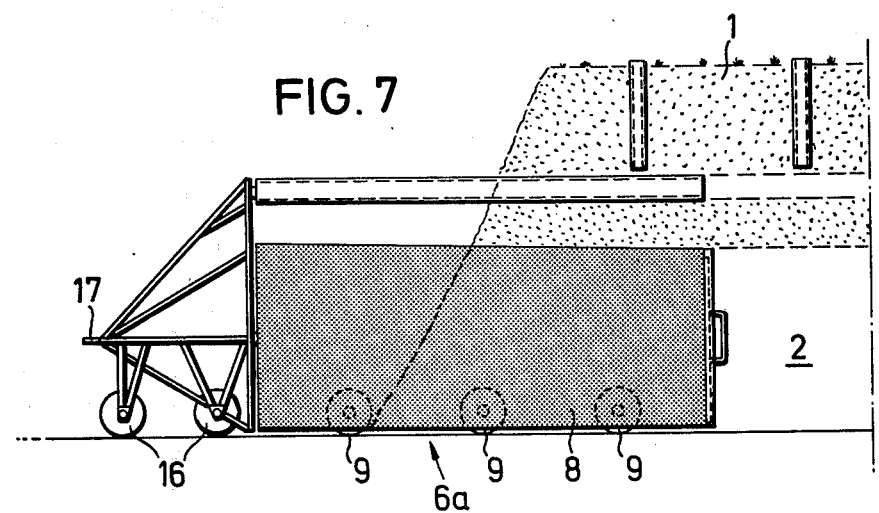

In the case of the embodiment according to FIGS. 6 and 7, the tunnel cores are so constructed that they taper longitudinally, vertically and laterally. The decrease in height of the tunnel core 6a over its length (which is, for example, in the region of some 5 m to 6 m) may preferably be maintained between approximately 2% to 5%. If the height of each tunnel core 6 at the fixed end thereof is, for example, 2.50 m the height at the opposite or free end of the core might amount to approximately 2.40 m. By employing such a very slight variation in height, the pointed arch shaped hollow course 2 within the stack remains practically unaltered in height.

The width of each tunnel core 6 is intended to decrease over its length to a greater degree. This decrease should be up to approximately 30% and possibly a little over. If, for example, the tunnel core 6a has a width at the fixed end of approximately 0.6 m the width at the opposite or free end should be only approximately 0.4 m. These figures apply especially to a tunnel core approximately 5 m to 6 m long. By this form of construction, withdrawal of each core assembly is facilitated without the necessity of lowering it somewhat.

It will be appreciated that a stack of material to be composted may be initiated by placing a series of core assemblies, each as shown in FIG. 3 for example, adjacent one end wall structure 20. The layering or piling of the material can then start at this end of the assembly, proceeding along the series of core assemblies. The vent pipes 14 can be inserted as the depth of the material increases above the tunnels 2 and as soon as the material becomes self-supporting at the starting end of the stack, the first covered core assembly may be removed and transported to the end of the series, and so on, until a desired length of stack is achieved, at which position another end wall structure 20 is placed. The vent pipes 14 are also progressively removed as the material becomes self-supporting.

Whereas the minimum rate of the decrease in height of the tunnel core will be between approximately 2% to 5%, this decrease can be higher, too. On average, the slightly wedge-shape of the tunnel template should be achieved satisfactorily with a taper of approximately 8% to 20% with a mean of some 10%.

What is claimed is:

1. A method for the treatment and purification of particulate waste material capable of being composted, which comprises the steps of:
   (a) piling successive layers of particulate material to provide an elongate stack thereof, said particulate material being a material such as waste material or a mixture of refuse and sewage sludge;
   (b) supporting the material piled in step (a) to provide a plurality of longitudinally extending, transversely spaced tunnels in said stack, which tunnels expose the stack interiorly to ambient air;
   (c) controlling the depth of the stacked material above said tunnels so that natural circulation of ambient air through said stack from said tunnels is sufficient to allow aerobic fermentation of said material without rotting;
   (d) allowing said stack to undergo said aerobic fermentation and thermal retting in undisturbed state until the stack has matured as compost material; and
   (e) step (b) being effected by a series of core assemblies, and including the step of withdrawing each core assembly after the material has covered it as in step (c) and the material has become self-supporting.

2. A method as defined in claim 1 including the step of forming vertical vents in the material above said tunnels.

3. A method as defined in claim 2 including the step of forming transverse passages in the material of said stack above said tunnels.

4. A method as defined in claim 3 wherein said transverse passages are staggered relative to said tunnels.

5. A method as defined in claim 3 wherein said transverse passages are staggered relative to said tunnels.

6. A method as defined in claim 1 including the step of forming transverse passage in the material of said stack above said tunnels.

7. A method as defined in claim 6 wherein said transverse passages are staggered relative to said tunnels.

8. A method as defined in claim 1 including the step of forming transverse passages in the material of said stack above said tunnels.

9. Apparatus which defines a core assembly for allowing particulate material prepared for composting to be spaced and provided with sufficient natural air circulation through the stack to avoid rotting, comprising in combination an arch-like core member having opposite side walls converging at their upper ends to define an air circulation space therebetween, said side walls having a plurality of perforation means therein for circulating air therethrough and through the particulate material, means for movably supporting said core member to allow said core member to be transported longitudinally for withdrawal from a stack of material, a plurality of horizontally disposed ventillating tubes each connected at one end to said frame structure in staggered relation to and disposed above said core members.

10. Apparatus as defined in claim 9 wherein a plurality of said core members are provided, and including a wheeled frame structure to which all of said core members are attached, said core members being attached at one end thereof to said frame structure whereby to protect longitudinally therefrom.

11. Apparatus as defined in claim 10 including means for vertically adjusting said core member relative to said supporting means.

12. Apparatus as defined in claim 9 wherein said side walls are spaced apart at their lower ends by an amount equal to about one third to one quarter the height of the core member.

13. Apparatus as defined in claim 12 including means for vertically adjusting said core member relative to said supporting means.

14. Apparatus as defined in claim 9 wherein said core member is of diminishing height and of diminishing width from one end to the other.

15. Apparatus as defined in claim 14 wherein the height of said core member decreases by approximately 2-5% from said one end to said other end.

16. Apparatus as defined in claim 15 including means for vertically adjusting said core member relative to said supporting means.

17. Apparatus as defined in claim 14 wherein the width of said core member decreases up to approximately 30% from said one end to said other end.

18. Apparatus as defined in claim 17 including means for vertically adjusting said core member relative to said supporting means.

19. Apparatus as defined in claim 14 wherein on average, the slightly wedge-shape of the tunnel template should be achieved satisfactorily with a taper of approximately 8% to 20% with a mean of some 10% in the height and in the width of said core member.

20. Apparatus as defined in claim 19 including means for vertically adjusting said core member relative to said supporting means.

21. Apparatus as defined in claim 14 including means for vertically adjusting said core member relative to said supporting means.

22. Apparatus as defined in claim 19 including an end wall means adjustably closing one end of said air circulation space.

23. Apparatus as defined in claim 22 including means for vertically adjusting said core member relative to said supporting means.

24. Apparatus as defined in claim 9 including means for vertically adjusting said core member relative to said supporting means.

25. Apparatus as defined in claim 9 including means for vertically adjusting said core member relative to said supporting means.

26. Apparatus for the treatment and purification of waste material capable of being composted comprising means for forming a plurality of transversely spaced longitudinally extending tunnels in a stack of waste material capable of being composted, said forming means including a plurality of aperture means therethrough for circulating air through said forming means and the waste material being composted, and means for progressively withdrawing the forming means simultaneously from the stack as the latter becomes self-supporting.

27. The apparatus as defined in claim 26 wherein said forming means are a plurality of core assemblies disposed in side-by-side relation, each core assembly comprising a plurality of tunnel-shaped core members joined together to be movable as a unit, each core member including opposite side walls having said aperture means to allow air circulation therethrough, the core members of each assembly being spaced apart on the order of 1-1.5 meters and the spacing between adjacent core assemblies likewise being on the order of 1-1.5 meters.

28. The apparatus as defined in claim 27 including a pair of end wall members disposed at the opposite ends of the series of core assemblies.

29. An assembly for temporarily confining and supporting particulate material which has been prepared for composting, comprising in combination:
a plurality of core assemblies disposed in side-by-side relation, each core assembly comprising a plurality of tunnel-shaped core members joined together to be movable as a unit, each core member including permeable opposite side walls to allow air circulation therethrough the core members of each assembly being spaced apart in the order of 1-1.5 meters and the spacing between adjacent core assemblies likewise being in the order of 1-1.5 meters, and each end wall member includes a series of vertically spaced slots to allow air circulation therebetween.

30. An assembly as defined in claim 29 wherein said slots are adjustable to control said air circulation therebetween.

31. An assembly as defined in claim 30 wherein said slots incline downwardly and inwardly relative to compost material disposed between said end wall members.

32. The apparatus as defined in claim 26 wherein said forming means are a plurality of elongated cores, and said withdrawing means include wheel means for movably supporting said cores.

33. The apparatus as defined in claim 32 including a plurality of elongated means positioned above said cores for forming elongated channels in said stack generally parallel to said tunnels.

34. The apparatus as defined in claim 26 including a plurality of elongated means positioned above said cores for forming elongated channels in said stack generally parallel to said tunnels.

35. The apparatus as defined in claim 26 wherein said forming means are a plurality of elongated cores, a frame structure, and said core member being attached at one end thereof to said frame structure and project longitudinally therefrom.

36. The apparatus as defined in claim 35 including a plurality of elongated means positioned above said cores for forming elongated channels in said stack generally parallel to said tunnels.

37. The apparatus as defined in claim 26 including a plurality of elongated means positioned above and in staggered relationship to said cores for forming elongated channels in said stack generally parallel to and between said tunnels.

38. A method for the treatment and purification of waste material capable of being composted comprising the steps of forming a plurality of spaced tunnels in a stack of waste material capable of being composted by utilizing a plurality of apertured elongated cores, and withdrawing the cores from the stack after the latter has become self-supporting.

39. The method as defined in claim 38 including the further steps of forming elongated channels in the stack generally parallel to the tunnels by utilizing a plurality of elongated means positioned above the cores.

* * * * *